US012791417B2

(12) United States Patent
Farkas et al.

(10) Patent No.: US 12,791,417 B2
(45) Date of Patent: Nov. 10, 2026

(54) CAPACITIVE LEAK SENSING WITH DISCRETE FOURIER TRANSFORM-BASED CAPACITANCE MEASUREMENTS

(71) Applicant: DELL PRODUCTS L.P., Round Rock, TX (US)

(72) Inventors: Sandor Farkas, Round Rock, TX (US); Michael Stumpf, Cedar Park, TX (US); Adrianus Djohan, South Grafton, MA (US)

(73) Assignee: Dell Products L.P., Round Rock, TX (US)

( * ) Notice: Subject to any disclaimer, the term of this patent is extended or adjusted under 35 U.S.C. 154(b) by 224 days.

(21) Appl. No.: 18/825,723

(22) Filed: Sep. 5, 2024

(65) Prior Publication Data

US 2026/0063494 A1 Mar. 5, 2026

(51) Int. Cl.
*G01M 3/16* (2006.01)

(52) U.S. Cl.
CPC .................................... *G01M 3/16* (2013.01)

(58) Field of Classification Search
CPC ................................ G01M 3/16; G01M 3/165
See application file for complete search history.

(56) References Cited

U.S. PATENT DOCUMENTS

| | | | | |
|---|---|---|---|---|
| 4,728,882 | A | 3/1988 | Stanbro et al. | |
| 10,677,088 | B2 * | 6/2020 | Lee | F03D 17/00 |
| 2014/0190241 | A1 * | 7/2014 | Namou | G01M 3/045 73/40 |
| 2017/0160761 | A1 * | 6/2017 | Chan | H02J 1/06 |
| 2020/0333175 | A1 | 10/2020 | Huang et al. | |
| 2020/0348202 | A1 * | 11/2020 | Farkas | H05K 1/162 |
| 2020/0393319 | A1 * | 12/2020 | Rogers | G01L 19/086 |
| 2021/0385970 | A1 * | 12/2021 | Su | G01M 3/3263 |
| 2024/0023276 | A1 * | 1/2024 | Patel | H05K 7/20272 |
| 2024/0417894 | A1 * | 12/2024 | Yin | D03D 1/0047 |

* cited by examiner

*Primary Examiner* — David J Bolduc
(74) *Attorney, Agent, or Firm* — Larson Newman, LLP

(57) ABSTRACT

A leak detector that detects a potential fluid leak within an information handling system includes a signal generator, voltage divider circuitry, microstrip differential sensing element, signal processor, and fluid leak indicator. The signal generator generates an AC signal and conveys the AC signal to the microstrip differential sensing element through the voltage divider circuitry. The microstrip differential sensing element includes a pair of protectively covered, edge-coupled microstrip traces that, when driven by the AC signal, generate a sensing signal that is output to the signal processor. The signal processor determines a phase of the sensing signal and generates, based on the phase, a capacitance value associated with the microstrip differential sensing element. The fluid leak indicator indicates the occurrence of a potential fluid leak within the information handling system if the capacitance value exceeds a predetermined threshold.

20 Claims, 5 Drawing Sheets

CAPACITIVE LEAK SENSING WITH DISCRETE FOURIER TRANSFORM-BASED CAPACITANCE MEASUREMENTS

FIELD OF THE DISCLOSURE

The present disclosure generally relates to information handling systems, and more particularly relates to detecting a fluid leak within an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A leak detector that detects a potential fluid leak within an information handling system includes a signal generator, voltage divider circuitry, microstrip differential sensing element, signal processor, and fluid leak indicator. The signal generator generates an AC signal and conveys the AC signal to the microstrip differential sensing element through the voltage divider circuitry. The microstrip differential sensing element includes a pair of protectively covered, edge-coupled microstrip traces that, when driven by the AC signal, generate a sensing signal that is output to the signal processor. The signal processor determines a phase of the sensing signal and generates, based on the phase, a capacitance value associated with the microstrip differential sensing element. The fluid leak indicator indicates the occurrence of a potential fluid leak within the information handling system if the capacitance value exceeds a predetermined threshold.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
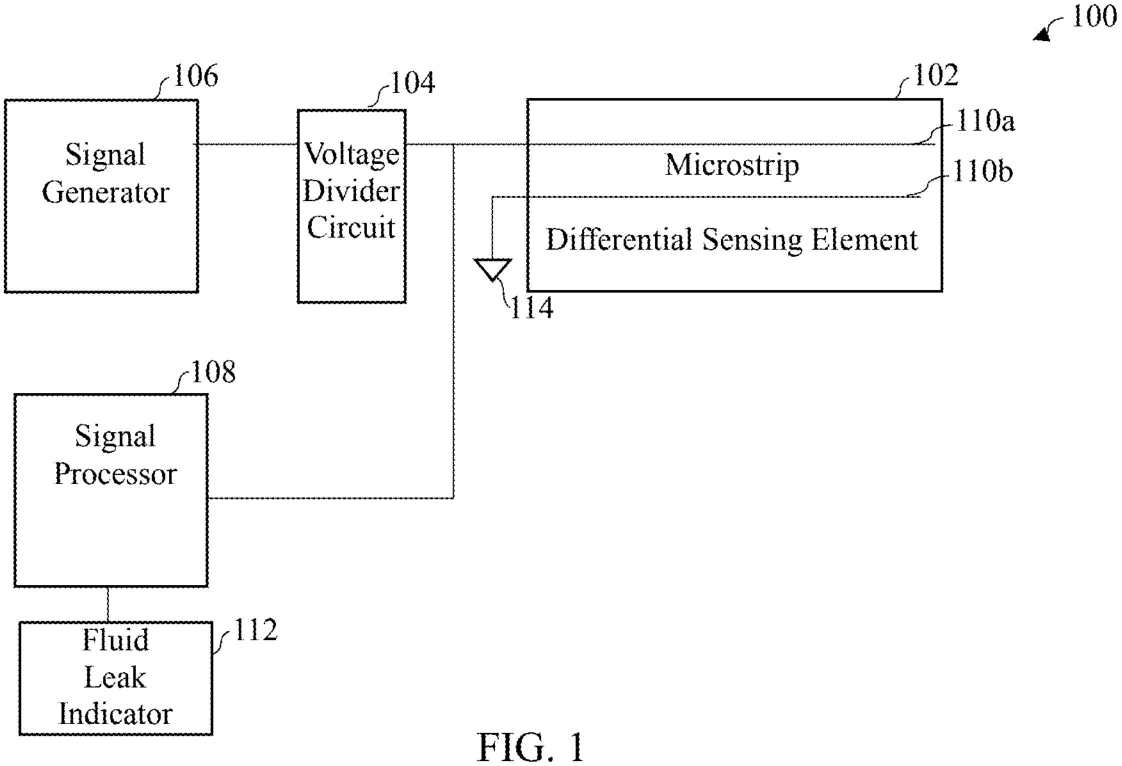
FIG. 1 is a block diagram of a leak detector for detecting a fluid leak within an information handling system according to at least one embodiment of the present disclosure.

FIG. 1 illustrates a leak detector 100, which includes microstrip differential sensing element 102, voltage divider circuit 104, signal generator 106, signal processor 108, and fluid leak detector 112. Leak detector 100 is capable of detecting a potential fluid leak within an information handling system. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or graphics processing unit (GPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

As the processing power of information handling systems continues to increase, the use of liquid cooling is expected to be more common. A liquid cooling system can circulate a fluid or coolant (e.g., water and additives) in a closed loop within the housing of the information handling system. The liquid cooling system can include fittings and joints and hoses to complete the closed loop. Components of the liquid cooling system may develop leaks over time due to vibration, thermal cycles, or aging. Any such leak that exposes the components of the information handling system to fluid can cause corrosion or damage to the circuitry within the housing.

Leak detector 100 detects a potential leak within an information handling system in response to a change in the capacitance associated with microstrip differential sensing element 102. The capacitance associated with microstrip differential sensing element 102 increases if the element is exposed to or comes in contact with a fluid.

Microstrip differential sensing element 102 includes microstrip traces 110*a* and 100*b*. Microstrips 110*a* and 110*b* may be edge coupled. Constant spacing between the pair of microstrip traces 110*a* and 110*b* provides predictable capacitance between the traces running parallel to one another on a dielectric layer. Microstrip differential trace sensing involves transmission of differential signals with the spaced apart microstrip traces. In various arrangements, the width of and spacing between microstrip traces 110*a* and 110*b* may be adjusted to control the sensitivity of microstrip differential sensing element 102. The voltage of one trace of microstrip differential sensing element 102, in certain arrangements, is ground-referenced by connecting the trace to ground (GND) 114. Ground referencing enhances signal measurements microstrip differential sensing element 102 by reducing signal-degrading noise.

Figure 2A:
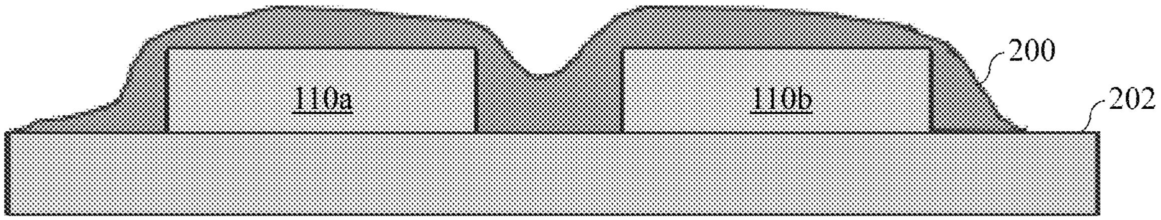
FIGS. 2A and 2B are cross-sectional views of a microstrip differential sensing element disposed on a dielectric substrate according to at least one embodiment of the present disclosure.
Figure 2B:
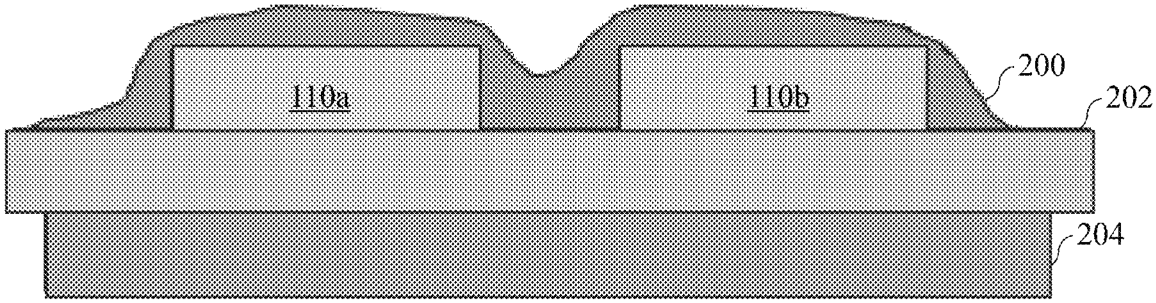

Referring additionally to FIGS. 2A and 2B, microstrip traces 110*a* and 110*b* are covered by protective layer 200. In some arrangements, protective layer 200 is formed by a solder mask, the solder mask covering edge-coupled microstrip traces 110*a* and 110*b*. In other arrangements, protective layer 200 is formed with coverlay, a protective film which may be used for example if microstrip differential sensing element 102 is implemented on a flexible printed circuit board (PCB). Protective layer 200 mitigates additional currents due to the inherent conductivity of a fluid if microstrip traces 110*a* and 11*b* are exposed to a leak. Microstrip traces 110*a* and 110*b* are disposed over dielectric layer 202. In certain embodiments, dielectric layer 202 overlays ground plane 204. Ground plane 204 is connected to a side of dielectric layer 202 opposite that on which microstrip traces 110*a* and 110*b* are disposed, as illustrated in FIG. 2B. Ground plane 204 may be hatched or perforated to enhance the sensing sensitivity of microstrip differential sensing element 102. The hatched or perforated ground plane minimizes trace-to-plane capacitance so that leak-induced capacitance is more noticeable, thereby providing higher sensitivity. In certain embodiments, microstrip traces 110*a* and 110*b* loop back on themselves to cancel common mode noise and to increase the capacitance associated with microstrip differential sensing element 102 if the element is exposed to a fluid.

Operatively, microstrip differential sensing element 102 is driven by an AC signal conveyed from signal generator 106 through voltage divider circuit 104 to the microstrip differential sensing element. Driven by the AC signal, microstrip traces 110*a* and 110*b* generate a sensing signal that is conveyed from microstrip differential sensing element 102 to signal processor 108. Signal processor 108, as described in greater detail in the following paragraphs, generates a capacitance value associated with microstrip differential sensing element 102 based on the phase of the sensing signal, its angular frequency, and a resistance associated with the voltage divider circuit 104. If the capacitance value determined by signal processor 108 exceeds a predetermined threshold, then fluid leak indicator 112 responds by generating a notification to indicate the possible occurrence of a fluid leak within the housing of the information handling system.

In certain embodiments, voltage divider circuit 104 is formed by a resistance-capacitance (RC) low-pass filter that couples with microstrip differential sensing element 102 through a resistor (FIG. 3), thereby forming a voltage divider with the microstrip differential sensing element. The voltage at the input of voltage divider circuit 104 is time-varying voltage, $V_{in}$, which may be represented by the cosine waveform $$V_{in} = A\cos(\omega t), \qquad \text{EQ. (1)}$$

where A is the input signal magnitude, ω is angular frequency, and t is time. In response, microstrip traces 110*a* and 110*b* of microstrip differential sensing element 102 generate a sensing signal. The sensing signal output by microstrip differential sensing element 102 may be represented by the cosine waveform $$V_{out} = B\cos(\omega t + \theta), \qquad \text{EQ. (2)}$$

where B is sensing signal magnitude and θ is the phase. Without transient signal effects in a steady state, the angular frequency, ω, of the sensing signal output by microstrip differential sensing element 102 is the same as that for the AC signal input driving the microstrip differential sensing element.

The magnitude, A, angular frequency, ω, and resistance, R, are known circuit parameters. The magnitude, B, and phase, θ, are response variables that can be determined from the sensing signal output by microstrip differential sensing element 102 to signal processor 108. The phase, θ, is $$\theta = \tan^{-1}(-\omega RC), \qquad \text{EQ. (3)}$$

It follows that the capacitance, C, associated with microstrip differential sensing element 102 is $$C = \frac{\tan\theta}{-\omega R}, \qquad \text{EQ. (4)}$$

where tan $$\theta = \frac{\text{im}}{\text{re}},$$

and where re and im are, respectively, the real and imaginary parts of the sinewave representation of the AC signal. With the AC signal measured on microstrip differential sensing element 102, the re and im are available from signal processor 108.

Therefore, given that tan $$\theta = \frac{\text{im}}{\text{re}},$$

the capacitance, C, associated with microstrip differential sensing element 102 can be expressed as $$C = \frac{-\text{im}}{\omega R\,\text{re}}. \quad \text{EQ. (5)}$$

Exposed to a fluid such as water or coolant (e.g., water and one or more additives), microstrip differential sensing element 102's capacitance, C, increases owing to the higher dielectric constant of most such fluids. Although the sensitivity of microstrips 110*a* and 110*b* are reduced somewhat by being covered by layer 200 (e.g., solder mask, coverlay), the change in capacitance, C, that occurs in response to microstrip differential sensing element 102 being exposed to a fluid can be significant. For example, the capacitance of microstrip differential sensing element 102 formed with a pair of edge-coupled, six-inch microstrips covered with a solder mask is approximately 8.72 pico-Farads (pF) when dry. The capacitance may increase to 15.2 pF, however, when microstrip differential sensing element 102 is exposed to a fluid leak.

Figure 3:
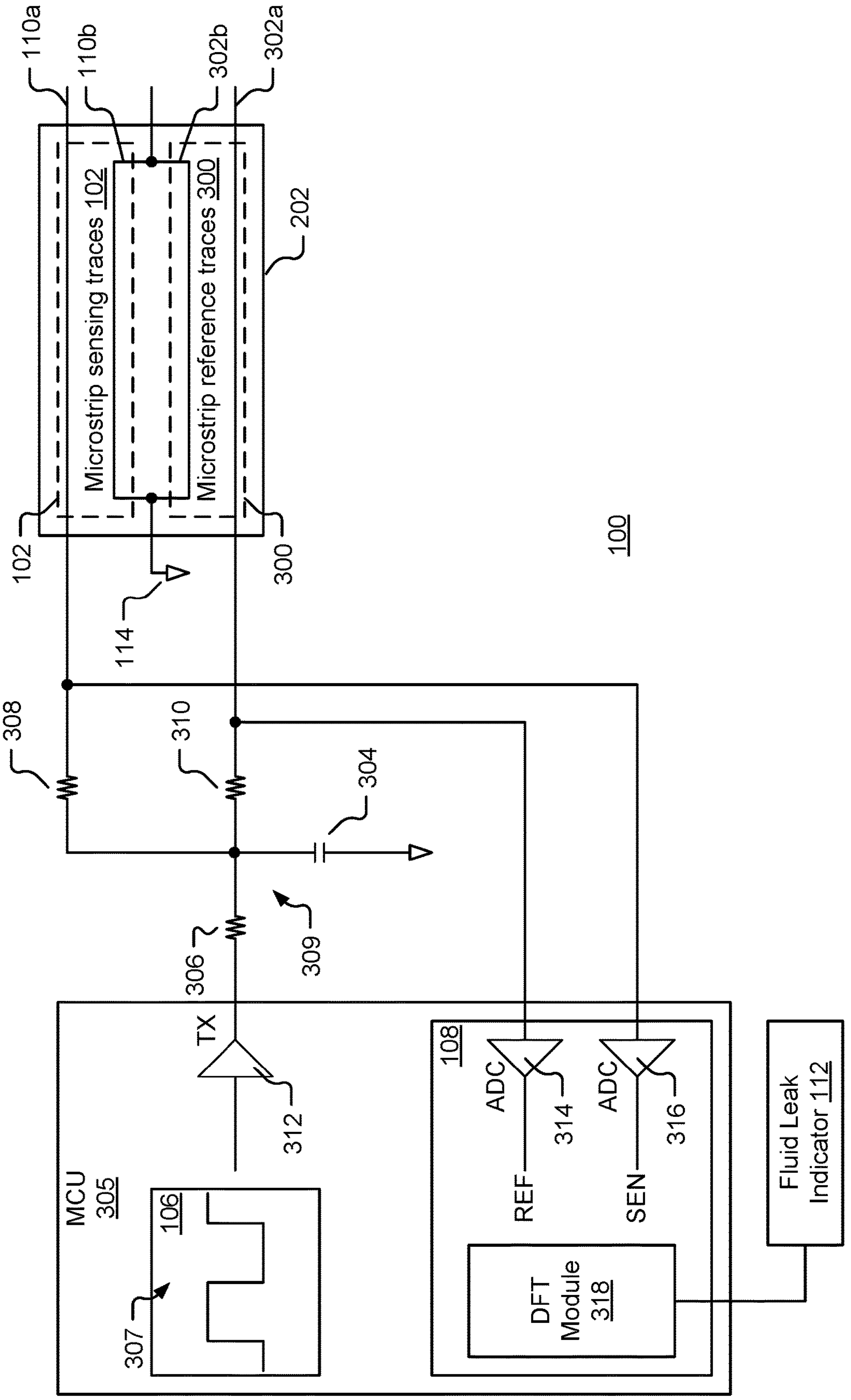
FIG. 3 is a schematic diagram illustrating an information handling system leak detector having both a sensing microstrip differential sensing element and a reference microstrip differential sensing element according to at least one embodiment of the present disclosure.

Nonetheless, especially if the change in capacitance is relatively small, it may be necessary to rule of other factors that make leak detector 100's measure of capacitance inaccurate. Such factors can include variations in component and PCB manufacturing, as well as variable temperature and humidity effects, which make detecting changes in capacitance difficult, particularly when the changes are slight. Certain embodiments of the present disclosure are therefore directed to enhancing sensitivity in detecting even small changes in capacitance. The enhanced sensitivity, in accordance with certain embodiments, is achieved by use of an additional microstrip differential sensing element configured to generate a reference signal FIG. 3 illustrates an embodiment of leak detector 100 that includes microstrip differential sensing element 102, whose microstrip traces 110*a* and 110*b* operate as microstrip sensing traces, and reference microstrip differential sensing element 300, whose microstrip traces 302*a* and 302*b* operate as microstrip reference traces. Reference microstrip differential sensing element 300 may be positioned within a region of the information handling system in which the likelihood of a fluid leak is less than a predetermined leak-probability threshold. Similar to microstrip traces 110*a* and 110*b*, microstrip traces 302*a* and 302*b* are protectively covered, edge-coupled microstrip traces. One microstrip trace of each pair of microstrip traces (microstrip traces 110*a* and 110*b* and microstrip traces 302*a* and 302*b*) are ground-referenced by connecting the microstrip traces to GND, so that voltages may be measured with single-ended measurements.

Both microstrip differential sensing element 102 and reference microstrip differential sensing element 300 are driven by an AC signal from signal generator 106 implemented by microcontroller unit (MCU) 305. In certain embodiments, signal generator 106 generates pulse width modulation (PWM) signal 307. MCU 305 illustratively includes transmitter (Tx) 312 which outputs PWM signal 307 to RC low-pass filter 309 formed by resistor 306 and capacitor 304. RC low-pass filter 309 converts PWM signal 307 to an AC signal to drive both microstrip differential sensing element 102 and reference microstrip differential sensing element 300. The AC signal to drive microstrip differential sensing element 102, passes through RC low-pass filter 309 and resistor 308, which jointly form a voltage divider. The same AC signal passes through RC low-pass filter 309 and resistor 310 to drive reference microstrip differential sensing element 300.

With voltage divider circuit formed by the RC low-pass filter 309 and resister 308 coupled with microstrip differential sensing element 102, time-varying voltage output of the microstrip differential sensing element is $$V_{out} = V_{in} * \frac{1/j\omega C}{R + 1/j\omega C} = V_{in} * \frac{1}{1 + j\omega RC} = V_{in} * \frac{1 - j\omega RC}{1 + (\omega RC)^2}. \quad \text{EQ. (6)}$$

where ω is angular frequency and where R is resistance 308, and C is capacitance 304.

Implemented in MCU 305, signal processor 108 includes analog-to-digital converter (ADC) 314 and ADC 316. ADC 314 samples the reference signal output by reference microstrip differential sensing element 300, converting the reference signal to digital reference signal REF. ADC 316 samples the sensing signal output by microstrip differential sensing element 102, converting the sensing signal to digital sensing signal SEN. MCU 305, in certain embodiments, includes discrete Fourier transform (DFT) module 318. DFT module 318 is configured to perform discrete Fourier transformations to determine a magnitude and phase of the digital REF and SEN signals. The resolution of phase is 2π/N, where N is the number of points in the DFT and can be selectively set to a high value. The accuracy of angular frequency, ω, may be within one percent (1%) with the internal clock of MCU 305 and less than 100 ppm with an external crystal. The accuracy of R may be set such that the error is substantially less than one percent (<<1%).

In general, the presence of an additional phase shift (e.g., low-pass filter, buffer) requires measuring two variables, one for the reference and one for the sensor. This not only cancels an unknown phase shift, but also removes manufacturing variations, as well as environmental factors. Accordingly, for generating a capacitance value to determine whether a potential leak has occurred, signal processor 108 implemented in MCU 305 utilizes both the phase of the sensing signal, $\theta_{sen}$, generated by microstrip differential sensing element 102 and the phase of the reference signal, $\theta_{ref}$, generated by reference microstrip differential sensing element 300.

The phase of the sensing signal, $\theta_{sen}$, is $$\arctan\left(\frac{\text{im}_{sen}}{\text{re}_{sen}}\right) = \theta_{sen}, \quad \text{EQ. (7)}$$

and the phase of the reference signal, $\theta_{ref}$, is $$\arctan\left(\frac{\text{im}_{ref}}{\text{re}_{ref}}\right) = \theta_{ref}. \quad \text{EQ. (8)}$$

Therefore, the phase difference, $\theta_{sen\text{-}ref}$, $$\arctan\left(\frac{\text{im}_{sen}}{\text{re}_{sen}}\right) - \arctan\left(\frac{\text{im}_{ref}}{\text{re}_{ref}}\right). \quad \text{EQ. (9)}$$

The capacitance value, C, is accordingly $$C=\frac{\tan(\theta_{sen}-\theta_{ref})}{-\omega R}=\frac{\tan\left(\arctan\left(\frac{im_{sen}}{re_{sen}}\right)-\arctan\left(\frac{im_{ref}}{re_{ref}}\right)\right)}{-\omega R}. \quad \text{EQ. (10)}$$

Algebraic manipulation and the application of the trigonometric identity $$\tan(a-b)=\frac{\tan(a)-\tan(b)}{1+\tan(a)*\tan(b)}$$

yields the capacitance value as function of angular frequency, resistance, and the real and imaginary parts of an AC waveform $$C=\frac{-1}{\omega R}*\left[\frac{\frac{im_{sen}}{re_{sen}}-\frac{im_{ref}}{re_{ref}}}{1+\frac{im_{sen}}{re_{sen}}*\frac{im_{ref}}{re_{ref}}}\right]= \quad \text{EQ. (11)}$$

$$\left(\frac{-1}{\omega R}\right)*\frac{\frac{im_{sen}*re_{ref}-im_{ref}*re_{sen}}{re_{sen}*re_{ref}}}{\frac{re_{sen}*re_{ref}+im_{sen}*im_{ref}}{re_{sen}*re_{ref}}}=$$

$$\frac{im_{ref}*re_{sen}-im_{sen}*re_{ref}}{\omega R*(re_{sen}*re_{ref}+im_{sen}*im_{ref})}.$$

As described above, if capacitive value, C, exceeds a predetermined threshold, then fluid leak indicator 112 generates an indication of a potential fluid leak with the information handling system. In some embodiments, fluid leak indicator 112 generates the indication by initiating an audible alarm embedded in or communicatively coupled with the information handling system. Fluid leak indicator 112, in other embodiments, initiates a visual message on a display screen of the information handling system. In still other embodiments, fluid leak indicator 112 includes a transmitter that generates the notification of a potential fluid leak to a remote site. The transmitter may be a wireline and/or wireless transmitter for conveying the notification of the potential fluid leak to a remotely situated user. With a wireless transmitter, fluid leak indicator 112 may convey a wireless notification of the potential fluid leak to the remotely situated user.

In some arrangements, the predetermined threshold is a capacitance value that corresponds to a value obtained with microstrip differential sensing element 102 being in a relatively dry condition under normal conditions (e.g., normal humidity and/or normal temperature). In certain embodiments the predetermined threshold is electronically stored in memory communicatively coupled with leak detector system. Predetermined dry readings for the threshold capacitance value (whether absolute and ratio) may be electronically stored in the memory at a time of deployment of leak detector 100. Leak detector 100 can be configured (e.g., by programming firmware of MCU 305) to perform periodic audits against one or more electronically stored capacitance values by measuring capacitance to check the health of microstrip differential sensing element 102. Measures that differ by more than a predetermined amount or percentage likely indicate dust particles and/or one or more other types of impairment to the performance of the sensor. Accordingly, in certain arrangements, leak detector system 100 is also configured to generate an indication to check the health of microstrip differential sensing element 102. In embodiments in which leak detector 100 additionally includes reference microstrip differential sensing element 300, the same or a similar procedure may be performed by the leak detector to check the functioning of the reference microstrip differential sensing element.

Figure 4:
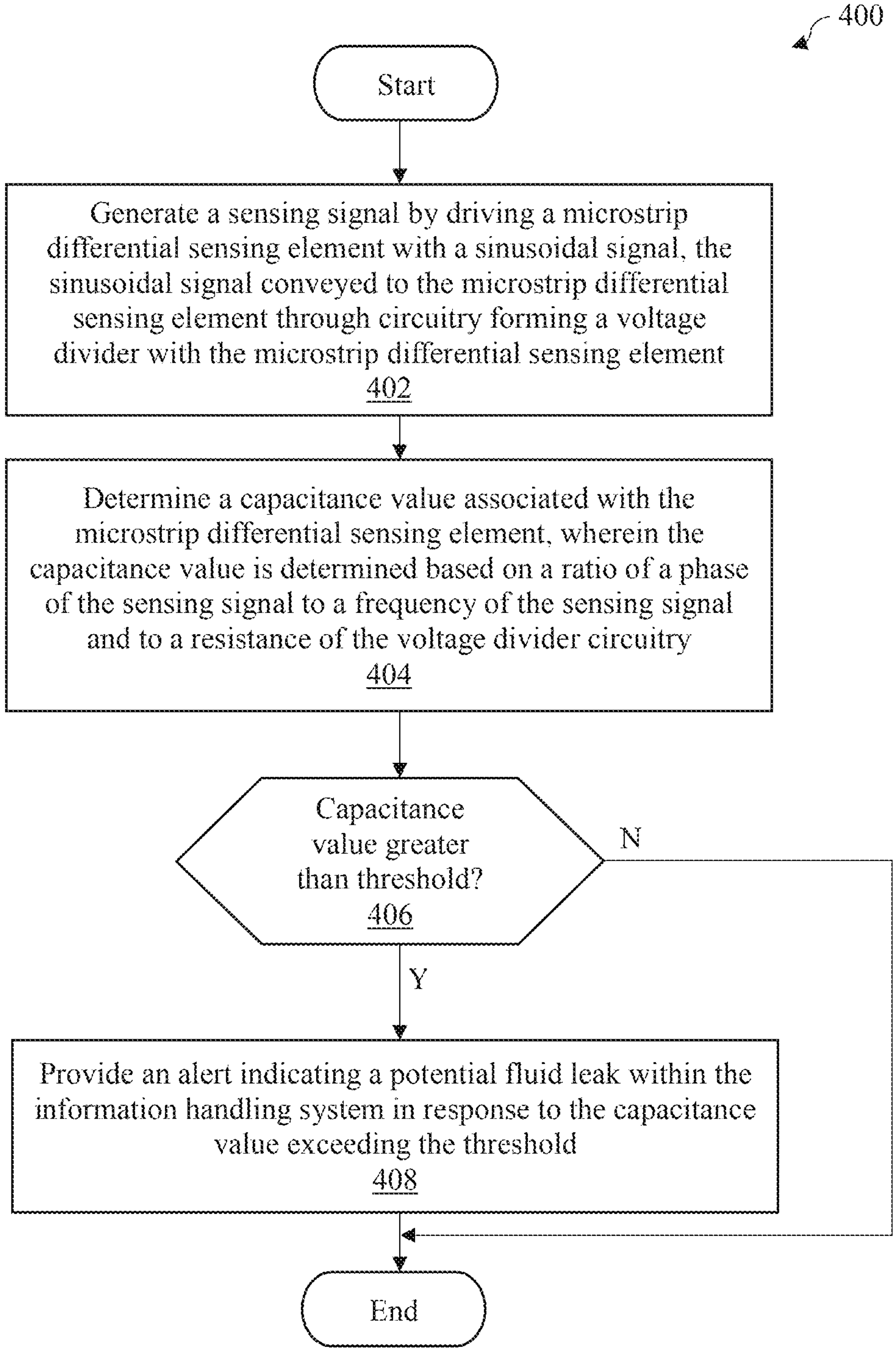
FIG. 4 is a flow diagram of a method of detecting a fluid leak within an information handling system according to at least one embodiment of the present disclosure.

FIG. 4 is a flow diagram of method 400 for detecting a fluid leak with an information handling system according to at least one embodiment of the present disclosure. It will be readily appreciated that not every method step set forth in this flow diagram is always necessary, and that certain steps of the methods may be combined, performed simultaneously, in a different order, or perhaps omitted, without varying from the scope of the disclosure. Method 400 may be performed in whole, or in part, by leak detector 100 described with respect to FIGS. 1 through 3.

At block 402, a sensing signal is generated by driving a microstrip differential sensing element with an AC signal. The AC signal is conveyed to the microstrip differential sensing element through circuitry forming a voltage divider with the microstrip differential sensing element. A capacitance value associated with the microstrip differential sensing element is determined at block 404. The capacitance value is determined based on a ratio or division of the phase of the sensing signal by the frequency of the sensing signal and a resistance of the circuitry. The resistance may be due to a resistor interposed between a low-pass filter and the microstrip differential sensing element, the low-pass filter and resistor forming a voltage divider with the microstrip differential sensing element. At block 406, a determination is made as to whether the capacitance value associated with the microstrip sensing element exceeds a threshold. The threshold may be a predetermined value or a ratio between the capacitance value and a predetermined value. If at block 406, the capacitance value associated with the microstrip sensing element exceeds the threshold, then at block 408 an alert is generated. The alert provides an indication that a potential fluid leak within the information handling system has occurred.

In certain embodiments, method 400 further includes generating a reference signal by driving a reference microstrip differential sensing element. The reference microstrip differential sensing element may be driven by the same AC signal that drives the microstrip sensing element. The capacitance value can be based on a phase shift or difference between the phase of the sensing signal and the phase of the reference signal.

In other embodiments of method 400 the phase and frequence of the sensing signal may be made by sampling the sensing signal. In certain embodiments in which the sensing signal is so sampled, the phase and frequency can be determined based on single-point discrete Fourier transform of the sensing signal.

Figure 5:
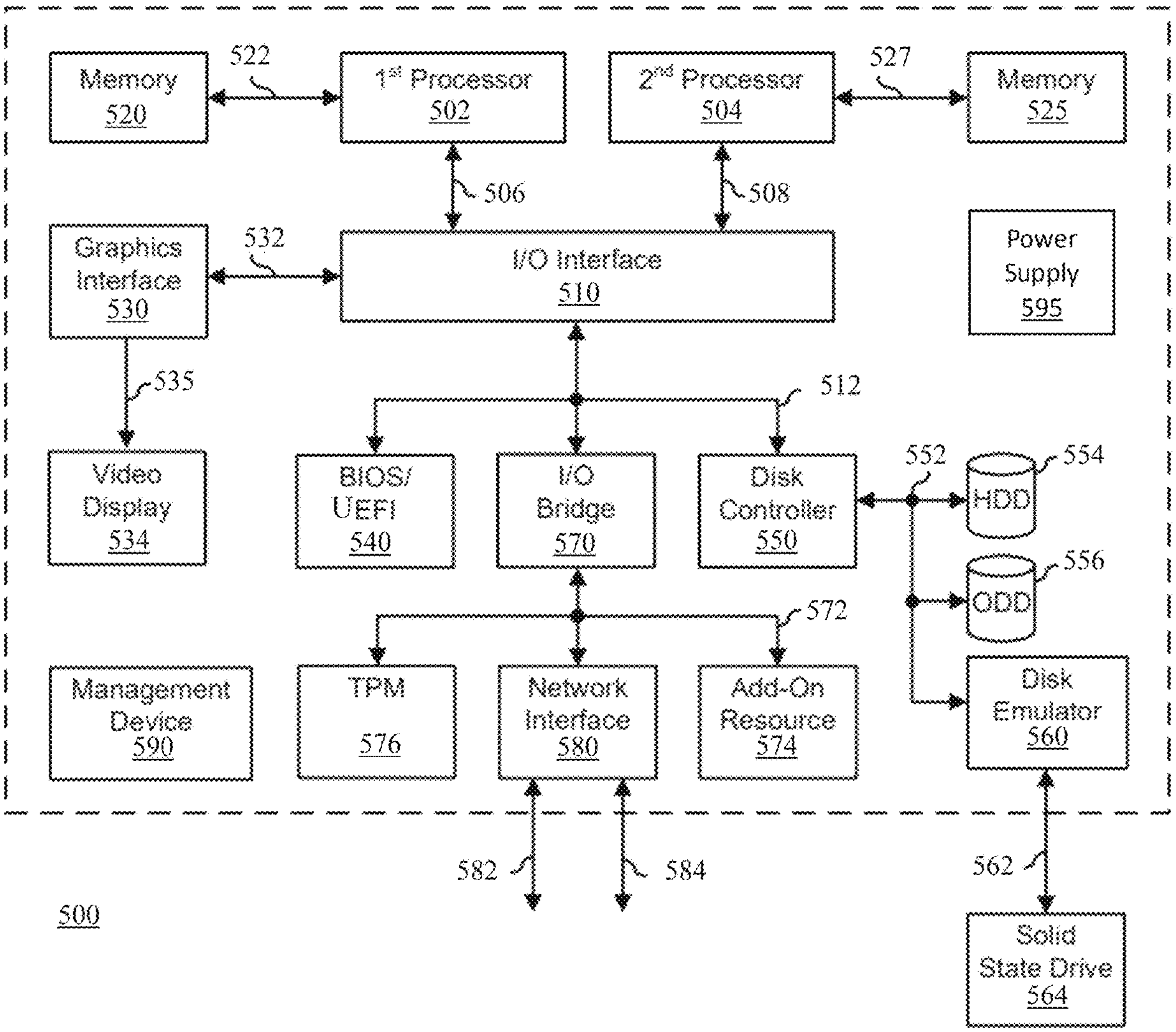
FIG. 5 is a block diagram of a general information handling system according to an embodiment of the present disclosure.

FIG. 5 shows a generalized embodiment of an information handling system 500 according to an embodiment of the present disclosure. Information handling system 500 may be substantially similar to an information handling system that includes a cooling unit or subsystem, which may be monitored for fluid leaks using leak detector 100 described with respect to FIGS. 1-3. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 564, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/UEFI module 540, disk controller 550, HDD 554, ODD 556, disk emulator 560, SSD 564, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532 and provides a video display output 536 to a video display 534. In a particular embodiment, information handling system 500 includes separate memories that are dedicated to each of processors 502 and 504 via separate memory interfaces. An example of memories 520 and 530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 4394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512 or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500.

Management device 590 can operate off a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

That which is claimed is:

1. A leak detector for detecting a fluid leak within an information handling system, the leak detector comprising:

a signal generator configured to generate an AC signal;

a voltage divider circuit operatively coupled with the signal generator;

a microstrip differential sensing element operatively coupled, through the voltage divider circuit, with the signal generator and having a pair of edge-coupled microstrip traces covered by a protective layer, wherein the microstrip differential sensing element is configured to output a sensing signal in response to the AC signal;

a signal processor operatively coupled with the microstrip differential sensing element, wherein the signal processor is configured to determine a phase of the sensing signal and to generate a capacitance value associated with the microstrip differential sensing element based on the phase; and a fluid leak indicator configured to indicate a potential fluid leak within the information handling system in response to the capacitance value exceeding a predetermined threshold.

2. The leak detector of claim 1, further comprising:

a reference microstrip differential sensing element operatively coupled, through the voltage divider circuit, with the signal generator and having a pair of protectively covered, edge-coupled microstrip traces, wherein the reference microstrip differential sensing element is configured to output a reference signal in response to the AC signal;

wherein the capacitance value generated by the signal processing unit is based on a combination of the phase of the sensing signal and a phase of the reference signal.

3. The leak detector of claim 2, wherein the reference microstrip differential sensing element is positioned within a region of the information handling system in which a likelihood of a fluid leak is less than a predetermined leak-probability threshold.

4. The leak detector of claim 2, wherein the signal processor implemented in a microcontroller unit (MCU), the MCU including a sensing signal analog-to-digital converter (ADC) to convert the sensing signal to a sensed digital signal;

a reference signal ADC to convert the reference signal to a reference digital signal; and a discrete Fourier transform (DFT) module configured to determine the capacitance value based on coherent sampling of the sensing and reference signals.

5. The leak detector of claim 4, wherein the DFT module is a single-point DFT module that determines signal magnitudes and phases with respect to a specific frequency bin.

6. The leak detector of claim 1, wherein the signal generator comprises a microcontroller unit (MCU), the MCU having a pulse width modulation (PWM) signal generator configured to generate a PWM signal; and a resistor-capacitor (RC) filter operatively coupled with the PWM signal generator, wherein the RC filter is configured to transform the PWM signal to the AC signal.

7. The leak detector of claim 1, wherein the capacitance value is generated by dividing the phase by an angular frequency of the sensing signal and a predetermined resistance value associated with the voltage divider circuitry.

8. The leak detector of claim 1, wherein the edge-connected microstrip traces are configured to loop back on themselves.

9. The leak detector of claim 1, further comprising a memory communicatively coupled with the leak detector to store a predetermined non-leak capacitance value, wherein the predetermined threshold is a predetermined percentage greater than the predetermined non-leak capacitance value.

10. The leak detector of claim 1, wherein the fluid leak indicator includes a wireless transmitter configured to indicate the potential fluid leak via transmission of a wireless signal.

11. The leak detector of claim 1, wherein the microstrip differential sensing element is disposed on a dielectric layer overlaying a ground plane.

12. The leak detector of claim 11, wherein the ground plane is perforated.

13. The leak detector of claim 1, wherein the protective layer is a solder mask.

14. The leak detector of claim 1, wherein the protective layer is formed with coverlay.

15. A method of detecting a fluid leak within an information handling system, the method comprising:

generating a sensing signal by driving a microstrip differential sensing element with an AC signal, wherein the AC signal is conveyed to the microstrip differential sensing element through circuitry forming a voltage divider with the microstrip differential sensing element;

determining a capacitance value associated with the microstrip differential sensing element, wherein the capacitance value is determined based on a ratio of a phase of the sensing signal to a frequency of the sensing signal and to a resistance of the voltage divider circuitry; and providing an alert indicating a potential fluid leak within the information handling system in response to the capacitance value exceeding a predetermined threshold.

16. The method of claim 15, further comprising:

generating a reference signal by driving a reference microstrip differential sensing element with the transformed AC signal; and determining whether the capacitance value exceeds the predetermined threshold by combining the phase of the sensing signal with a phase of the reference signal.

17. The method of claim 16, further comprising:

sampling the sensing signal; and determining the phase and frequency based on single-point discrete Fourier transform of the sensing signal.

18. A leak detector for detecting a fluid leak within an information handling system, the leak detector comprising:

a microstrip differential sensing element having a first pair of edge-coupled microstrip traces covered by a protective layer, wherein one of the first pair of edge-coupled microstrip traces is ground-referenced;

a reference microstrip differential sensing element spaced apart from the microstrip differential sensing element and having a second pair of edge-coupled microstrip traces covered by a protective layer, wherein one of the second pair of edge-coupled microstrip traces is ground-referenced;

a low-pass filter connected through a first resistor with the differential sensing element and connected through a second resistor with the reference differential sensing element; and a microcontroller unit operatively coupled with the low-pass filter and including a signal generator to generate a driving signal;

a transmitter to transmit the driving signal through the low-pass filter to drive the microstrip differential sensing element and the reference microstrip differential sensing element;

a signal processor configured to determine a capacitance value based upon phases of the sensing signal and reference signal; and a fluid leak indicator configured to indicate a potential fluid leak within the information handling system in response to the capacitance value exceeding a predetermined threshold.

19. The leak detector of claim 18, wherein the signal processor includes a sensing signal analog-to-digital converter (ADC) to sample the sensing signal generated in response to the driving signal and generate;

a reference signal ADC to sample a reference signal generated in response to the driving signal; and a discrete Fourier transform (DFT) configured to determine a frequency and the upon phases of the sensing signal and reference signal based upon a discrete Fourier transformation of the sensing and reference signal.

20. The leak detector of claim 19, wherein the discrete Fourier transformation is a single-point discrete Fourier transformation.

* * * * *